(12) United States Patent
Jerger et al.

(10) Patent No.: US 10,513,264 B2
(45) Date of Patent: Dec. 24, 2019

(54) CONTROLLER FOR A MOTOR VEHICLE AND METHOD

(71) Applicant: JAGUAR LAND ROVER LIMITED, Warwickshire (GB)

(72) Inventors: Rob Jerger, Coventry (GB); David Parry, Coventry (GB); Neil Dixon, Coventry (GB); Timothy Reynolds, Conventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 105 days.

(21) Appl. No.: 15/560,663

(22) PCT Filed: Mar. 31, 2016

(86) PCT No.: PCT/EP2016/057008
§ 371 (c)(1),
(2) Date: Sep. 22, 2017

(87) PCT Pub. No.: WO2016/156459
PCT Pub. Date: Oct. 6, 2016

(65) Prior Publication Data
US 2018/0099674 A1    Apr. 12, 2018

(30) Foreign Application Priority Data
Apr. 1, 2015    (GB) .................................. 1505644.3

(51) Int. Cl.
*B60W 30/18*    (2012.01)
*B60W 10/02*    (2006.01)
*B60W 10/10*    (2012.01)

(52) U.S. Cl.
CPC ...... *B60W 30/18118* (2013.01); *B60W 10/02* (2013.01); *B60W 10/10* (2013.01);
(Continued)

(58) Field of Classification Search
CPC .......... B60W 30/18118; B60W 30/181; F16H 2061/205; F16H 2061/207; F16H 2312/04
See application file for complete search history.

(56) References Cited

U.S. PATENT DOCUMENTS

| | | | | |
|---|---|---|---|---|
| 5,586,954 A | * | 12/1996 | Iwata | F16H 61/061 477/114 |
| 6,411,881 B1 | * | 6/2002 | Thomas | B60T 7/122 180/69.6 |
| 6,533,704 B2 | * | 3/2003 | Saito | F16H 61/20 477/901 |

OTHER PUBLICATIONS

"Transmission Control Strategy for Reduced Stopping Distance, Improved Brake Life & Vehicle Stability," Research Disclosure, Mason Publications, Hampshire, GB, No. 325, May 1, 1991, p. 306, XP000229659, ISSN: 0374-4353.

* cited by examiner

*Primary Examiner* — Erin D Bishop
(74) *Attorney, Agent, or Firm* — Carlson, Gaskey & Olds

(57) ABSTRACT

A controller for a motor vehicle includes means for receiving information indicative of a current vehicle speed; means for receiving information indicative of an amount of brake force a braking system is developing or is capable of developing; means for receiving information indicative of a gradient of a driving surface on which the vehicle is driving; and torque transmission reduction means for causing a powertrain torque reduction operation to be performed in which the controller causes one or more components in a torque transmission path from a torque delivery device to driven wheels to assume a torque reduction condition in which torque transmission is reduced or substantially terminated. The controller is configured automatically to cause the torque reduction operation to be performed in dependence at least in part on the information indicative of current
(Continued)

vehicle speed, information indicative of brake force amount and information indicative of driving surface gradient.

17 Claims, 3 Drawing Sheets

(52) U.S. Cl.
CPC ..... *B60W 30/181* (2013.01); *B60W 2510/182* (2013.01); *B60W 2520/10* (2013.01); *B60W 2520/12* (2013.01); *B60W 2550/142* (2013.01); *B60W 2710/021* (2013.01); *B60W 2710/105* (2013.01); *B60W 2710/1005* (2013.01)

CONTROLLER FOR A MOTOR VEHICLE AND METHOD

INCORPORATION BY REFERENCE

The content of UK patent GB2492655 is hereby incorporated by reference in its entirety.

TECHNICAL FIELD

The present disclosure relates to a controller for a motor vehicle. Aspects of the invention relate to a controller, a motor vehicle and a method.

BACKGROUND

It is known to provide a motor vehicle having engine stop/start functionality in which the engine is automatically switched off when the vehicle is temporarily held stationary using a braking system of the vehicle. In a vehicle having an automatic transmission, if the vehicle is held stationary against the driving force of the powertrain the transmission is configured to allow slip of one or more clutches and/or a torque converter thereof in order to prevent the engine from stalling. The engine constantly transfers torque to the driveline against the slipping clutches/torque converter, causing driveline "wind-up". In some known vehicles having stop/start functionality, the transmission is caused to either substantially fully disconnect the engine from the driveline before allowing the engine to switch off, or implement a transmission idle control functionality in which the amount of torque transmitted by the transmission 108 to the driveline 109 is reduced substantially, in some arrangements by around 60-80%, causing the driveline to relax and release energy stored by the driveline in its 'wound up' condition. The release of energy causes NVH (noise, vibration and harshness) shock, which may be felt by the driver. The engine is then turned off. It is to be understood that the NVH experienced by the driver whilst the driveline relaxes and the engine is switched off may be unexpected by the driver since it is typically not a substantially instant response to actuation of a control by the driver. In contrast, NVH due to restarting of the engine typically follows substantially immediately after release of the brake pedal 140P or depression of the accelerator pedal 110P by the driver.

It is an aim of the present invention to address disadvantages associated with the prior art.

SUMMARY OF THE INVENTION

Aspects and embodiments of the present invention provide a controller, a vehicle and a method. Embodiments of the invention may be understood with reference to the appended claims.

In one aspect of the invention for which protection is sought there is provided a controller for a motor vehicle. The controller may comprise means for receiving information indicative of a current vehicle speed. The controller may comprise means for receiving information indicative of an amount of brake force a braking system of the vehicle is developing or is capable of developing. The controller may comprise means for receiving information indicative of a gradient of a driving surface on which the vehicle is driving. The controller may comprise torque transmission reduction means for causing a powertrain torque reduction operation to be performed in which the controller causes one or more components in a torque transmission path from a torque delivery device to driven wheels of the vehicle to assume a torque reduction condition in which torque transmission from the torque delivery device to the driven wheels is reduced or substantially terminated. In an embodiment, the controller may be configured automatically to cause the torque reduction operation to be performed in dependence at least in part on the information indicative of current vehicle speed, information indicative of brake force amount and information indicative of driving surface gradient.

The torque delivery device may be any suitable device such as an engine, electric machine or any other suitable torque delivery device.

The vehicle speed signal indicative of current vehicle speed may be a vehicle reference speed signal. Generation of a vehicle reference speed signal is well known in the art, and may for example be set substantially equal to the speed of the second slowest turning wheel in some known systems. Other ways of determining a vehicle speed signal may be useful in some embodiments.

In embodiments in which the transmission has neutral-idle functionality the torque reduction operation may involve causing the transmission to assume a neutral-idle condition. A neutral-idle condition control mechanism for a torque-transmitting clutch device in a vehicle transmission connected to an engine is described for example in U.S. Pat. No. 6,123,645. In vehicles having such a clutch device within the transmission, the device may be placed in a slipping condition when the vehicle is at rest with the engine running and the transmission in a forward drive mode so that it transmits a reduced amount of torque, thereby reducing fuel consumption. The condition in which the clutch device, which is typically of wet friction clutch type, is caused to slip in this manner is typically denoted as neutral-idle. When in the neutral-idle condition the amount of torque transmitted by the clutch device is typically reduced by around 70%. Assumption of the neutral idle condition by the transmission is controlled automatically by a transmission controller and is therefore transparent to the driver, reducing driver workload. The clutch device may be configured to reduce the amount of torque transmitted from an input shaft of the transmission to a remainder of the transmission, or the amount of torque transmitted to an output shaft of the transmission from a remainder of the transmission.

The neutral-idle condition may be distinct from a neutral mode of operation of the transmission. In some embodiments, in the neutral-idle condition the output shaft of the transmission is substantially fully disconnected from the remainder of the transmission. In some embodiments a further clutch device is configured substantially fully to disconnect an output shaft of the transmission from the remainder of the transmission upstream of the output shaft with respect to a torque transmission path from the engine to the driveline, when neutral-idle condition is assumed. In some alternative embodiments the same clutch device providing neutral-idle functionality is employed to substantially fully disconnect an output shaft of the transmission from the transmission when the neutral mode of the transmission is assumed.

Alternatively or in addition, in some embodiments the torque reduction operation may comprise selection of a neutral mode of operation of the transmission.

In some embodiments the neutral mode may be selected after the neutral-idle condition has been assumed, to reduce driveline shunt when the neutral mode is assumed. In some embodiments an engine of the vehicle may be switched off once the neutral mode has been assumed, for example in order to implement stop/start functionality. In some embodiments the engine may be switched off once the neutral-idle condition has been assumed.

It is to be understood that by the term brake force is meant a force on a vehicle acting to oppose movement of the vehicle. If a vehicle is moving in a forward direction and the braking system is applied, a brake force will act on the vehicle in a direction opposite the forward direction of travel. It is to be understood that the brake fluid pressure in the braking system is indicative of the amount of brake force that the braking system may be developing at a given moment in time, whilst the vehicle is moving. Thus, if the vehicle is stationary and on level ground, the braking system may generate substantially no brake force even though the pressure of hydraulic brake fluid in the system may be relatively high due to depression of a brake pedal by the driver.

Other braking systems may provide similar braking effects such as hybrid regenerative braking, a parking brake (or handbrake), a retarder or any combination of these systems. Thus in some embodiments one or more of such braking systems may be employed, in addition to or instead of a friction braking system which may be a friction foundation braking system.

It is to be understood that, by reference to an amount of brake force a braking system of the vehicle is developing or is capable of developing is meant the amount of brake force a vehicle is actually developing, if it is moving, or capable of developing if the vehicle were stationary. If a vehicle is stationary with the braking system applied, substantially no brake force may be developed if the vehicle is on level ground. However if the vehicle is on a gradient, brake force may be developed by the braking system with the braking system applied even if the vehicle is stationary because of the force of gravity on the vehicle tending to accelerate the vehicle downhill. The brake force generated by the braking system must be sufficient to overcome the force of gravity on the vehicle if the vehicle is to remain substantially stationary.

The means for receiving information indicative of a current vehicle speed may comprise a processor configured to receive the information, optionally via an input signal line or onboard wireless receiver.

The means for receiving information indicative of an amount of brake force a braking system of the vehicle is developing or is capable of developing may comprise the same or another processor being configured to receive the information, optionally via an input signal line or onboard wireless receiver.

The means for receiving information indicative of a gradient of a driving surface on which the vehicle is driving may comprise the same or another processor being configured to receive the information, optionally via an input signal line or onboard wireless receiver.

The torque transmission reduction means may be provided by the same or another processor configured to execute computer program code to cause the torque reduction operation to be performed.

The controller may be configured wherein the means for receiving information indicative of a current vehicle speed, means for receiving information indicative of an amount of brake force a braking system of the vehicle is developing or is capable of developing, and means for receiving information indicative of a gradient of a driving surface, comprises an electronic processor having an electrical input for receiving one or more signals indicative of said information, and an electronic memory device electrically coupled to the electronic processor and having instructions stored therein, and the torque transmission reduction means comprises the processor being configured to access the memory device and execute the instructions stored therein such that it is operable automatically to cause the torque reduction operation to be performed in dependence at least in part on the information indicative of current vehicle speed, information indicative of brake force amount and information indicative of driving surface gradient.

The controller may be configured to determine, in dependence on the brake force information and gradient information, whether the amount of brake force is sufficient to hold the vehicle stationary on a driving surface having a gradient substantially equal to that of the current driving surface, the controller being configured to cause the torque reduction operation to be performed in dependence at least in part on the determination.

The controller may be configured to determine the amount of force on the vehicle due to gravity, in dependence at least in part on the gradient information. The controller may then determine whether the prevailing brake force is sufficient to hold the vehicle substantially stationary on a driving surface having a gradient substantially equal to the present gradient.

Where the braking system is a hydraulic braking system, such as is commonly used in motor vehicles such as cars, trucks, buses and the like, the controller may be provided with a look up table correlating minimum values of braking system pressure resulting from depression of a brake pedal with values of driving surface gradient. The controller may be configured to determine the minimum value of brake pressure that must be present for a driving surface having a gradient substantially equal to the prevailing (instant) gradient the vehicle is experiencing, and determine whether the prevailing value of brake pressure is equal to or greater than the minimum value for the prevailing gradient. The prevailing gradient value may be determined by low pass filtering measured values of gradient or calculating a time averaged value based on measured values, to reduce the risk that an erroneous value is employed not being truly representative of the prevailing gradient.

The controller may be configured to cause the torque reduction operation to take place in further dependence on information indicative of an amount of positive tractive torque at one or more wheels.

The amount of tractive torque may be calculated according to the amount of torque generated by the torque delivery device (or plurality of torque delivery devices where more than one is present) and a gear ratio between the torque delivery device and one or more wheels of the vehicle if the device is connected to one or more wheels. Thus, in some embodiments the controller may receive a signal indicative of the amount of torque generated by the torque delivery device, and the currently selected gear of a transmission of the vehicle. Where more than one transmission or gearbox of variable gear ratio is provided in a torque transmission path to the one or more wheels, for example a high/low ratio power transfer unit or power take-off unit, the gear ratio selected at each transmission or gearbox may be provided to the controller. In some embodiments, the controller may be configured to not allow a torque reduction operation to take place if the amount of tractive torque at a given wheel exceeds a predetermined value, such as 50 Nm, 100 Nm or any other suitable value.

In some embodiments, the controller may calculate the net torque at a wheel in dependence on the amount of tractive torque and brake torque at the wheel, and the gradient of the driving surface on which the vehicle is driving. The controller may be configured to permit a torque reduction operation to take place, and not prevent a torque reduction operation from taking place, if the amount of brake force is sufficient to maintain the vehicle stationary provided the tractive torque at the one or more wheels remains substantially unchanged and the gradient of the driving surface remains substantially unchanged.

The controller may be configured to prevent a torque reduction operation from taking place if the amount of tractive force exceeds a predetermined value.

The predetermined value may be any suitable value such as 50 Nm, 100 Nm or any other suitable value.

Optionally, the torque transmission reduction means is configured to cause a torque reduction operation to be performed at least in part by causing a transmission of the vehicle to assume a condition in which the torque delivery device is at least partially disconnected from a driveline of the vehicle.

Optionally, the torque transmission reduction means is configured to cause a torque reduction operation to be performed at least in part by causing the transmission of the vehicle to assume a neutral-idle condition whilst in a forward drive mode of operation of the transmission.

Optionally, the torque transmission reduction means is configured to cause a torque reduction operation to be performed at least in part by causing the transmission to transition from a forward drive mode of operation of the transmission to a neutral mode of operation of the transmission.

The forward drive mode may be one of a plurality of forward drive modes in some embodiments such as a 'drive' mode, a 'second gear limited' mode in which the transmission may only assume a first or second gear thereof, and a sport mode.

Optionally, the torque transmission reduction means is configured to cause a torque reduction operation to be performed at least in part by causing a driveline coupled to the transmission to assume a predetermined mode of operation.

Optionally, the predetermined mode of operation is a mode in which at least a portion of the driveline is disconnected from the transmission.

The controller may be configured wherein the predetermined mode is a first mode and not a second mode, wherein in the second mode of operation the driveline is configured wherein the number of wheels driven by the torque delivery device is greater than in the first mode.

The first mode may for example correspond to a two wheel drive mode of operation of the driveline, whilst the second mode may correspond to a four wheel drive mode of operation. The controller may cause the driveline to switch between the first and second modes by controlling operation of one or both of a power transfer or power take-off unit, and a rear drive unit.

In some embodiments, such as some vehicles in which the front wheels only are driven by the torque delivery device when the driveline is in the first mode and front and rear wheels are driven by the torque delivery device when in the second mode, the power transfer or take-off unit may be operable to disconnect the transmission from a prop-shaft of the vehicle, whilst the rear drive unit may be operable to disconnect the prop-shaft from rear wheels of the vehicle. Other arrangements may be useful in some embodiments.

In some embodiments, such as some vehicles in which the rear wheels only are driven by the torque delivery device when the driveline is in the first mode and both front and rear wheels are driven by the torque delivery device when in the second mode, the power transfer or take-off unit may be operable to disconnect the transmission from the front wheels of the vehicle whilst the rear wheels are substantially permanently connected to a torque output of the transmission. Other arrangements may be useful in some embodiments.

In some embodiments having a power transfer or take-off unit and a rear drive unit it is advantageous if the torque reduction operation includes the controller causing the prop-shaft to become disconnected from the transmission. This is so as to reduce the number of components of the driveline coupled to a torque output of the transmission, and therefore the number of components that may be subject to driveline windup in the event that the torque delivery device continues to deliver drive torque to the torque output of the transmission when the vehicle is held stationary.

Optionally, the torque transmission reduction means is configured to cause a torque reduction operation to be performed at least in part by causing a driveline coupled to the transmission to assume a predetermined mode of operation and subsequently to cause the transmission to assume the condition in which the torque delivery device is at least partially disconnected from the driveline.

Thus, for example, in some embodiments the controller may cause the driveline to assume a two wheel drive mode of operation unless the driveline is already in the two wheel drive mode, and subsequently to cause the transmission to assume the neutral-idle condition.

The controller may be further configured to cause the torque delivery device to substantially cease torque delivery when the torque reduction operation has been completed.

Thus, in the case that the torque delivery device is an engine, the controller may cause the engine to be switched off once the transmission has assumed the condition in which the engine is at least partially disconnected from the driveline. This feature may be employed for example in vehicles having automatic engine stop/start functionality in order to reduce emissions and has the advantage that the amount of driveline windup may be reduced before the engine is switched off, reducing the amount of NVH associated with a stop/start operation.

Optionally, the brake force information is indicative of an amount of hydraulic brake fluid pressure in a braking system of the vehicle.

Optionally, the means for receiving information indicative of an amount of brake force comprises means for receiving a brake force signal carrying the information indicative of the amount of brake force.

The controller may be configured to determine whether the brake force signal corresponds to an amount of brake force sufficient to hold the vehicle stationary with the transmission in any suitable torque reduction condition for which the vehicle is configured, for example a condition in which a neutral mode of operation of the transmission is selected. This is because whenever a torque reduction condition is assumed, the amount of drive force causing the vehicle to travel in the selected direction is reduced, optionally substantially to zero. The amount of brake force generated by the braking system must be sufficient to hold the vehicle stationary on the driving surface when the vehicle is stationary. It is to be understood that in known vehicles the amount of brake force required to hold a vehicle stationary with the transmission in a forward drive mode (D) without the neutral idle condition selected when facing uphill will typically be lower than if the transmission were in the forward drive mode with the neutral-idle condition selected or in the neutral mode instead of the forward drive mode.

This is because a forward driving force is generated by the powertrain (which includes the torque delivery device such as an engine, transmission and driveline) when the vehicle is stationary. This forward driving force is responsible for the phenomenon of 'idle creep' exhibited by some vehicles on level ground, in which when the torque delivery device is generating torque and the transmission is in the forward drive mode the vehicle creeps forward when the brake pedal is released.

Optionally, the means for receiving information indicative of a current vehicle speed comprises means for receiving a vehicle speed signal carrying the information indicative of vehicle speed.

Optionally, the means for receiving information indicative of a gradient of a driving surface comprises means for receiving a gradient signal indicative of the gradient of the driving surface.

The controller may be configured to not allow a torque reduction operation to take place if current vehicle speed exceeds a predetermined value.

The predetermined value may be any suitable value such as 5 kph, 10 kph, 15 kph or any other suitable speed value.

In an aspect of the invention for which protection is sought there is provided a vehicle comprising a body, a plurality of wheels, a powertrain to drive said wheels, a braking system to brake said wheels, and a system according to any preceding claim.

In an aspect of the invention for which protection is sought there is provided a method of controlling a motor vehicle. The method may comprise receiving information indicative of a current vehicle speed. The method may comprise receiving information indicative of an amount of brake force a braking system of the vehicle is developing or is capable of developing. The method may comprise receiving information indicative of a gradient of a driving surface on which the vehicle is driving. The method may comprise causing a powertrain torque reduction operation to be performed the torque reduction operation comprising causing one or more components in a torque transmission path from a torque delivery device to one or more driven wheels of the vehicle to assume a torque reduction condition in which torque transmission from the torque delivery device to the one or more driven wheels is reduced or substantially terminated. In an embodiment, the method may comprise automatically causing the torque reduction operation to be performed in dependence at least in part on the information indicative of current vehicle speed, information indicative of brake force amount and information indicative of driving surface gradient.

The method may comprise determining, in dependence on the brake force information and gradient information, whether the amount of brake force is sufficient to hold the vehicle stationary on a driving surface having a gradient substantially equal to that of the current driving surface, the method comprising causing the torque reduction operation to be performed in dependence at least in part on the determination.

The method may comprise causing the torque reduction operation to take place in further dependence on information indicative of an amount of positive tractive torque at one or more wheels.

The method may comprise preventing a torque reduction operation from taking place if the amount of tractive force exceeds a predetermined value.

The method may comprise causing a torque reduction operation to be performed at least in part by causing the transmission to assume a condition in which the torque delivery device is at least partially disconnected from a driveline of the vehicle to which the transmission is coupled.

The method may comprise causing a torque reduction operation to be performed at least in part by causing the transmission to assume a neutral-idle condition whilst in a forward drive mode of operation of the transmission.

The method may comprise causing a torque reduction operation to be performed at least in part by causing the transmission to transition from a forward drive mode of operation of the transmission to a neutral mode of operation of the transmission.

The method may comprise causing a torque reduction operation to be performed at least in part by causing the driveline coupled to the transmission to assume a predetermined mode of operation.

Optionally, the predetermined mode of operation is a mode in which at least a portion of the driveline is disconnected from the transmission.

The method may comprise causing a torque reduction operation to be performed at least in part by causing the driveline to assume a first mode and not a second mode, whereby in the second mode of operation the driveline is configured whereby the number of wheels driven by the torque delivery device is greater than in the first mode.

Optionally, causing the torque reduction operation to be performed comprises causing the driveline coupled to the transmission to assume the predetermined mode of operation and subsequently causing the transmission to assume the condition in which the torque delivery device is at least partially disconnected from the driveline.

The method may further comprise causing the torque delivery device to substantially cease torque delivery when the torque reduction operation has been performed.

Optionally, receiving the brake force information comprises receiving information indicative of an amount of hydraulic brake fluid pressure in a braking system of the vehicle.

Optionally, receiving information indicative of an amount of brake force comprises receiving a brake force signal carrying the information indicative of the amount of brake force.

Optionally, receiving information indicative of a current vehicle speed comprises receiving a vehicle speed signal carrying the information indicative of vehicle speed.

Optionally, receiving information indicative of a gradient of a driving surface comprises receiving a gradient signal indicative of the gradient of the driving surface.

In an aspect of the invention for which protection is sought there is provided a carrier medium carrying computer readable code for controlling a vehicle to carry out the method of a preceding aspect.

In one aspect of the invention for which protection is sought there is provided a computer program product executable on a processor so as to implement the method of a preceding aspect.

In another aspect of the invention for which protection is sought there is provided a computer readable medium loaded with the computer program product of a preceding aspect.

In an aspect of the invention for which protection is sought there is provided a processor arranged to implement the method or the computer program product of a preceding aspect.

The controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements are also useful.

In one aspect of the invention for which protection is sought there is provided a controller for a motor vehicle. The controller may be configured to receive information indicative of a current vehicle speed, information indicative of an amount of brake force a braking system of the vehicle is developing or is capable of developing in its instant configuration (e.g. for the instant value of brake pedal depression), and information indicative of a gradient of a driving surface on which the vehicle is driving. The controller is configured to cause a powertrain torque reduction operation to be performed in which the controller causes one or more components in a torque transmission path from a torque delivery device such as an engine to driven wheels of the vehicle to assume a torque reduction condition. In this condition the amount of torque generated by the torque delivery device that is delivered to the driven wheels is reduced, optionally substantially to zero in some embodiments. The controller may be configured automatically to cause the torque reduction operation to be performed in dependence at least in part on the information indicative of current vehicle speed, information indicative of brake force amount and information indicative of driving surface gradient. In some embodiments the torque reduction operation may be triggered if the conditions are met that vehicle speed is below a predetermined threshold such as 5 kph, 10 kph or other suitable value, and the amount of brake force that is being generated by the vehicle is sufficient to hold the vehicle stationary on the current driving surface taking into account the gradient of the driving surface. The torque reduction operation may involve automatically placing a transmission of the vehicle in a neutral mode of operation such as an 'N' mode, and/or triggering a transmission idle control condition to become active in which a clutch device or other torque reduction device associated with or comprised by the transmission is actuated to a released or slipping condition, reducing the amount of torque transmitted by the transmission from the torque delivery device such as an engine to the driven wheels, optionally to the driveline.

For the present purposes, in a vehicle having a powertrain comprising a torque delivery device coupled to a transmission that is in turn coupled to a driveline, the powertrain is considered to comprise the torque delivery device, transmission and driveline. The driveline is not considered to comprise the transmission or torque delivery device. It is to be understood that a further transmission may be comprised by the driveline such as a power transfer or power take off unit for allowing switching for example between a two wheel drive mode and a four wheel drive mode of operation in a vehicle having such modes. Other arrangements may be useful in some embodiments.

Thus in one aspect of the invention, triggering a torque reduction operation comprises the controller triggering a reduction in the amount of drive torque generated by the torque delivery device that the transmission allows to be transmitted therethrough to the driveline.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
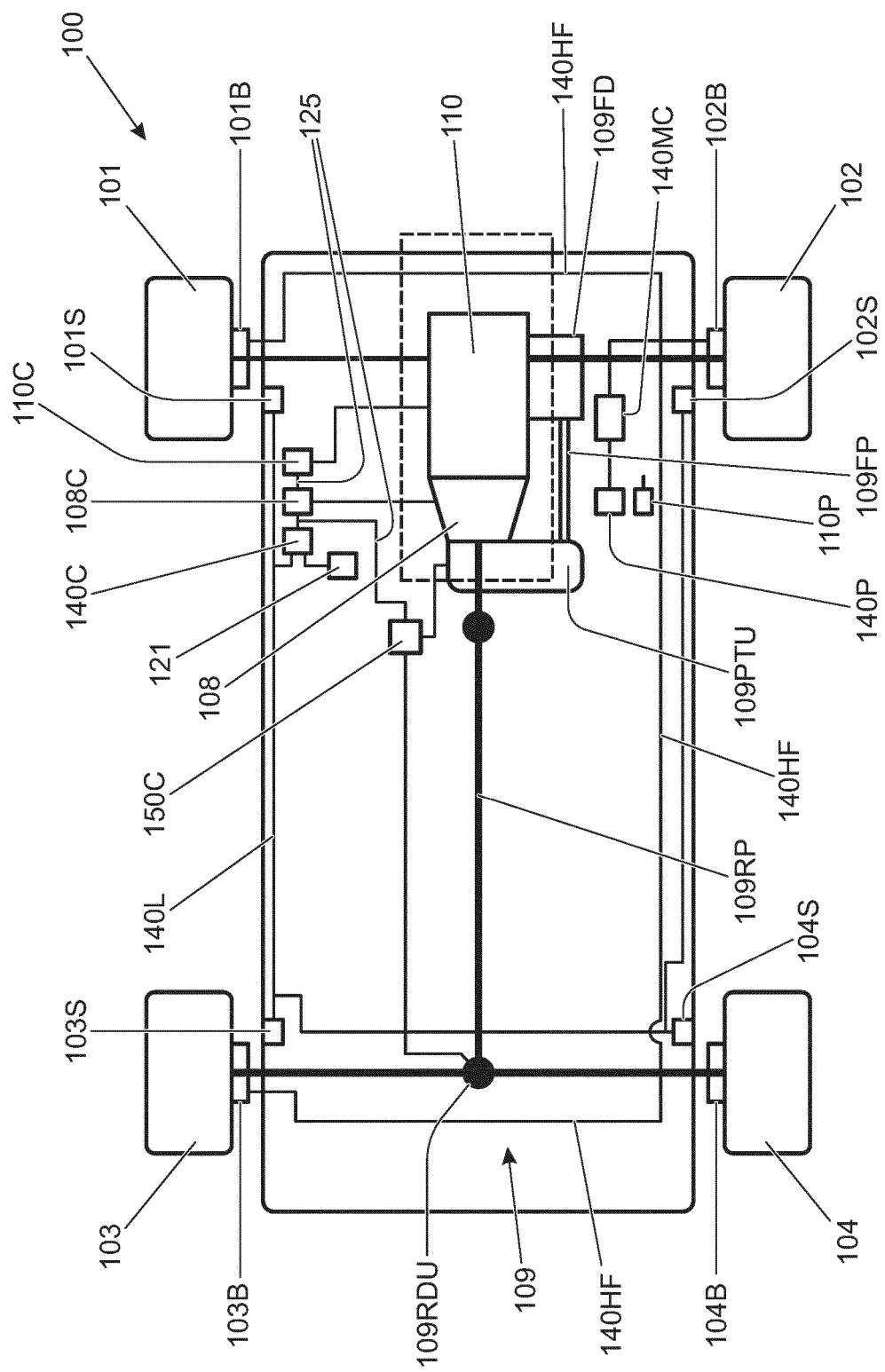
FIG. 1 is a schematic illustration of a vehicle according to an embodiment of the present invention.

FIG. 1 shows a vehicle 100 according to an embodiment of the present invention. The vehicle 100 has an internal combustion engine 110 operable to provide motive torque to a transmission 108. The vehicle 100 has a driveline 109 by means of which the transmission 108 may be coupled to a pair of rear wheels 103, 104 of the vehicle 100 by means of a rear prop shaft 109RP and rear drive unit 109RDU. The transmission 108 is releasably connectable to a pair of front wheels 101, 102 by means of a power transfer unit (PTU) or transfer box 109PTU under the control of a driveline controller 150C. The PTU 109PTU has a power transfer clutch (not shown), front prop shaft 109FP and front differential gear box 109FD, which also form part of the driveline 109.

The vehicle 100 has an engine controller 110C configured to control the engine 110 in response to actuation of an accelerator pedal 110P, a transmission controller 108C configured to control the transmission 108 and an anti-lock braking system (ABS) controller 140C configured to control a braking system (not shown) in response to actuation of a brake pedal 140P. The transmission controller 108C is configured to cause the transmission 108 to assume an operating mode selected from amongst a park mode P, reverse mode R in which a reverse gear is selected, neutral mode N in which the transmission 108 causes the engine 110 to be disconnected from the driveline 109 by opening a transmission clutch, a drive mode D in which the transmission 108 automatically selects an appropriate forward gear in dependence at least in part on vehicle speed, engine speed and powertrain torque demand, a sport mode S in which the transmission is controlled in a similar manner to the drive mode D but the engine speeds at which upshifts are commanded are increased in order to enhance a responsiveness of the vehicle 100 to powertrain torque demands, and a low gear mode L in which the transmission 108 is constrained to operate in only a predetermined one or more low gears, such as first and second only, or first only. The low gear mode L provides increased engine braking, which may be useful when descending a gradient or towing.

Figure 2:
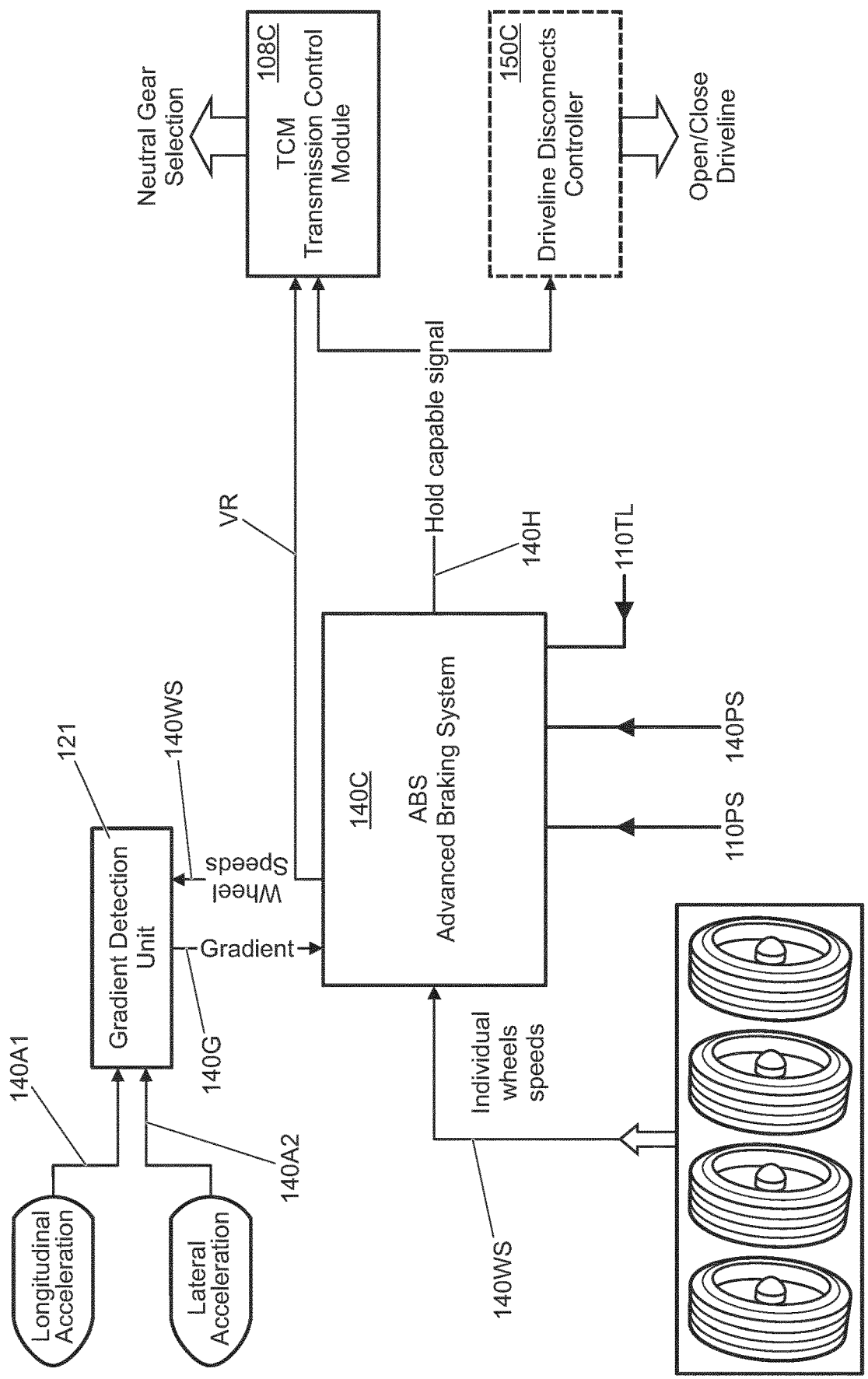
FIG. 2 is a schematic illustration of a portion of a control system of the embodiment of FIG. 1.

FIG. 2 is a schematic illustration showing in further detail the configuration of the vehicle 100.

The ABS controller 140C receives wheel speed signals 140WS (FIG. 2) via signal line 140L (FIG. 1) from each of four wheel speed sensors 101S-104S that are configured to measure the speed of respective wheels 101-104 of the vehicle 100. The ABS controller 140C employs the wheel speed signals 140WS to generate a vehicle reference speed value VR indicative of vehicle speed. The reference speed value VR is set by the ABS controller 140C to be substantially equal to the speed of the second slowest turning wheel at a given moment in time. Other methods of calculating a vehicle reference speed value VR may be useful in some embodiments. The vehicle reference speed value is made available to other vehicle controllers such as controllers 110C, 108C via a communications bus 125. In some embodiments the bus 125 may be a controller area network (CAN) bus although other types of bus may be useful in some embodiments.

The ABS controller 140C receives an accelerator pedal position signal 110PS indicative of an amount by which a driver has depressed the accelerator pedal 110P and a brake pressure signal 140PS indicative of an amount of hydraulic brake fluid pressure present at a slave brake cylinder of each wheel. Each slave cylinder is provided in a brake module 101B-104B associated with each wheel and is arranged to actuate a corresponding wheel calliper of the brake module to cause a brake pad of the module 101B-104B to be urged against a brake disc of the module 101B-104B to cause braking, in the conventional manner. The slave cylinders are in fluid communication with a brake master cylinder 140MC via hydraulic fluid lines 140HF also in the conventional manner. The brake master cylinder 140MC is actuated by the brake pedal 140P. It is to be understood that the amount of hydraulic brake fluid pressure at each slave cylinder, and therefore the amount of brake force that the braking system may develop at a given moment in time, may be controlled by the driver by means of the brake pedal 140P. In some embodiments the brake pressure signal received by the controller 140C may correspond to the pressure of brake fluid at a hydraulic fluid outlet of the master cylinder 140MC rather than at each slave cylinder.

The vehicle 100 of FIG. 1 is configured such that, when the vehicle slows to a halt, the transmission controller 108C causes a torque reduction operation to be performed in which the transmission controller 108C causes the transmission 108 to assume the neutral mode N prior to the vehicle stopping, provided the amount of brake force being applied by the driver is sufficient to hold the vehicle 100 stationary once the vehicle 100 has stopped, as explained in more detail below.

As shown in FIG. 2, in addition to receiving wheel speed signals 140WS, the ABS controller 140C also receives a gradient signal 140G indicative of the gradient of the driving surface over which the vehicle 100 is driving. The gradient signal 140G is generated by a gradient detection unit 121 that receives a longitudinal acceleration signal 140A1 indicative of an amount of longitudinal acceleration being experienced by the vehicle 100 at a given moment in time, a lateral acceleration signal 140A2 indicative of an amount of lateral acceleration being experienced by the vehicle 100 at a given moment in time, and the wheel speed signals 140WS. The gradient detection unit 121 calculates the gradient using the signals 140A1, 140A2, 140WS in a known manner. In some embodiments the gradient detection unit 121 receives the vehicle reference speed signal VR instead of or in addition to the wheel speed signals 140WS. It is to be understood that receiving the individual wheel speeds may be useful in providing information in respect of cornering for comparison with lateral acceleration information. In some alternative embodiments, the controller 140C may receive the gradient signal 140G from a global satellite positioning (GPS) system instead of from the gradient detection unit 121. In some still further embodiments, the ABS controller 140C may be configured to calculate driving surface gradient by reference to a comparison of net wheel torque, based on wheel tractive torque and braking torque, compared with measured vehicle acceleration. If the amount of acceleration of the vehicle is greater than expected, the controller 140C may determine that the vehicle is travelling downhill, whilst if the amount of acceleration of the vehicle is lower than expected, the controller 140C may determine that the vehicle is travelling uphill.

The ABS controller 140C also receives a train load signal 110TL from the engine controller 110. Signal 110TL is indicative of a train load of the vehicle 100. By train load is meant the effective loading on the vehicle 100 including the actual vehicle weight (inclusive of passengers and cargo) and any additional loading due to a towed load. In some embodiments the controller 140C may employ a substantially fixed vehicle weight or mass value as a standard load value, such as gross vehicle weight (GVW). The train load signal may be employed by the gradient estimation signal to determine the expected value of vehicle acceleration at a given moment in time, assuming travel on a level surface, for the prevailing value(s) of net wheel torque at one or more wheels.

The ABS controller 140C employs the gradient detection signal 140G and train load signal 110TL to calculate the amount of hydraulic brake force that would be required to be developed by the vehicle braking system in order to maintain the vehicle 100 in a substantially stationary condition if the vehicle 100 was to come to a halt on the current driving surface. It is to be understood that, the greater the gradient of the driving surface, the greater the amount of brake force required to maintain the vehicle 100 stationary for a given train load.

If the ABS controller 140C determines that the amount of brake force being developed is greater than a predetermined minimum value, and in addition is sufficient to maintain the vehicle 100 stationary should the vehicle 100 come to rest, the controller 140C outputs a 'hold capable' signal 140H to the transmission controller 108C and driveline controller 150C indicating that the braking system is in a condition in which it is capable of holding the vehicle 100 stationary. It is to be understood that the controller 140C determines whether the amount of brake force is greater than the predetermined minimum value in order to ensure that the at least some brake force is present, i.e. a driver has depressed the brake pedal 140 by at least a minimum amount, indicating an intention to stop the vehicle 100.

The transmission controller 108C monitors an input signal line for receipt of the hold capable signal 140H. If the hold capable signal 140H is present and the vehicle reference speed VR is below a predetermined threshold value, the transmission controller 108C triggers a torque reduction operation. That is, as described above, the controller 108C causes the transmission 108 to assume the neutral mode N, thereby disengaging the engine 110 from the driveline 109.

In the present embodiment this is achieved by opening a clutch within the transmission 108 although other arrangements may be useful in some embodiments. In some embodiments the transmission 108 may assume a mode other than the neutral mode N, whilst still disengaging the engine 110 from the driveline 109.

In the present embodiment, the ABS controller 140C continues to monitor the hydraulic brake fluid pressure in the braking system. If the amount of the brake fluid pressure falls below an amount sufficient to maintain the vehicle 100 stationary, the ABS controller 140C terminates transmission of the hold capable signal 140H. In response, the transmission controller 108C reconnects the transmission 108 to the driveline 109 as soon as the transmission controller 108C confirms that the engine 110 is running. It is to be understood that, in some embodiments where engine stop/start technology is employed, the engine controller 110C may be configured to switch off the engine 110 when the vehicle 100 is stationary in order to reduce fuel consumption, and to restart the engine 110 upon detection that the brake pedal 140P has been released. In some embodiments the engine controller 110C may be configured to restart the engine 110 upon detection that the accelerator pedal 110P has been depressed.

As shown in FIG. 2, the 'hold capable' signal 140H is also provided to the driveline controller 150C. In the present embodiment the driveline controller 150C is configured, upon receipt of the hold capable signal, to cause the driveline 109 to assume a disconnected condition in which the PTU 109PTU and RDU 109RDU assume open conditions thereby isolating the rear prop shaft 109RP from the transmission 108 and rear wheels 103, 104. This has the advantage that, if the PTU 109PTU and RDU 109RDU assume open conditions prior to the vehicle 100 coming to rest, wind-up of the portion of the driveline from the PTU 109PTU to the rear wheels 103, 104 is substantially prevented from taking place whilst the vehicle 100 is initially at rest. Consequently, a reduced amount of NVH (if any) is suffered when the engine 110 is subsequently disconnected from the driveline 109 and switched off. It is to be understood that the PTU 109PTU and RDU 109RDU may assume open conditions at different respective times. For example, in some embodiments the PTU 109PTU may assume an open condition before the RDU 109RDU in order to expedite opening of the PTU 109PTU. This may be at least in part because the torque transmission path from the transmission 108 to the PTU 109PTU is shorter than that from the transmission 108 to the RDU 109RDU. Opening of the PTU 109PTU first reduces the length of driveline torque transmission path coupled to the output shaft of the transmission 108, and therefore the amount of any energy stored in any components of the driveline that remain coupled to the transmission output shaft when the PTU 109PTU is opened.

In some embodiments, the ABS controller 140C may cause the transmission controller 108C to cause the transmission to assume the neutral mode N and subsequently cause the driveline controller to cause the driveline to assume the two wheel drive mode of operation if the driveline is in the four wheel drive mode.

In some alternative embodiments the ABS controller 140C may first cause the driveline controller to cause the driveline to assume the two wheel drive mode of operation if the driveline is in the four wheel drive mode, and subsequently cause the transmission controller 108C to cause the transmission 108 to assume the neutral mode N.

In some embodiments the transmission controller 108C may be configured to cause the transmission to assume a neutral-idle condition rather than neutral mode N when the hold capable signal 140H is received, if the transmission 108 has neutral-idle capability. As noted above, in the neutral-idle condition a control mechanism for a torque-transmitting clutch device of the transmission is caused to assume a condition in which torque transmission by the clutch is reduced, optionally substantially to zero. Operation of a known transmission having such functionality is described for example in U.S. Pat. No. 6,123,645.

It is to be understood that reference herein to reception by a controller of a signal includes generation of that signal by the controller itself and utilisation of that signal by the controller.

Figure 3:
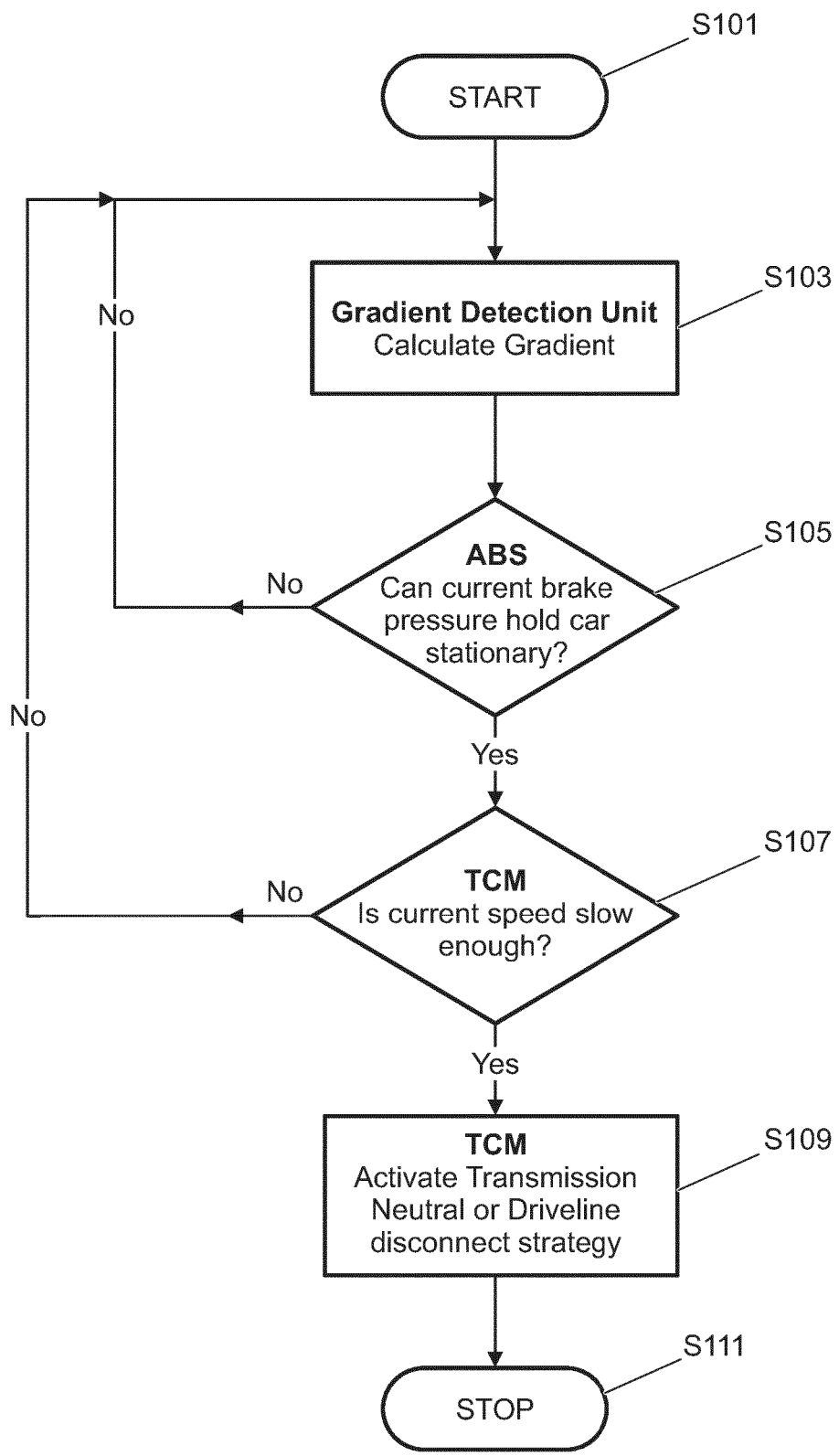
FIG. 3 is a flow diagram illustrating a method of controlling a vehicle according to an embodiment of the present invention.

FIG. 3 illustrates a method of controlling the vehicle of the embodiment of FIG. 1 described above.

At step S101 the method commences.

At step S103 gradient detection unit 121 generates a signal 140G indicative of the gradient of the driving surface over which the vehicle 100 is driving and transmits this signal to the ABS controller 140C.

At step S105 the ABS controller 140C determines, by reference to brake pressure signal 140PS and vehicle train load signal 110TL whether the pressure of hydraulic brake fluid in the vehicle braking system is sufficient to hold the vehicle 100 stationary on the driving surface. If the brake pressure signal 140PS indicates the brake pressure is sufficient, the ABS controller 140 outputs the hold capable signal 140H to the transmission controller 108C and driveline controller 150C. The method then continues at step S107. If the signal 140PS indicates that the brake pressure is not sufficient, the method continues at step S103.

At step S107 the transmission controller 108C checks the vehicle reference speed signal VR. If the vehicle reference speed signal is below the threshold reference speed value, and the hold capable signal 140H is being received from the ABS controller 140, the method continues at step S109 else the method continues at step S103. In the present embodiment the threshold reference speed value is 20 kph although other values may be useful in alternative embodiments such as 5 kph, 10 kph, 15 kph, 25 kph or any other suitable value.

At step S109 the transmission controller 108C causes the transmission 108 to assume the neutral mode N. Similarly, the driveline controller 150C causes the PTU 109PTU and RDU 109RDU to assume open conditions. In the present embodiment the PTU 109PTU is caused to open, and subsequently the RDU 109RDU.

At step S111 the method terminates.

It is to be understood that one or more of the steps described above may be performed in parallel using the same or different processors and/or controllers. For example, in some embodiments steps S103 and S105 may be performed in parallel with step S107, and step S109 executed in the event that steps S105 and steps S107 both result in an affirmative determination.

In some embodiments, the vehicle 100 may be provided with a terrain controller (not shown) or other controller configured to cause the vehicle 100 to operate in one of a plurality of different subsystem configuration modes in order to provide different vehicle performance characteristics such that the vehicle may be operated in a predetermined one of a plurality of different driving modes. In some embodiments the vehicle 100 also has an electronic power assisted steering unit (ePAS unit) and a suspension control system. The terrain controller may be configured to cause each of a plurality of the vehicle subsystems (including the engine controller 110C, ABS controller 140C, transmission controller 108C, driveline controller 150C, ePAS unit and suspension control system) to operate in the subsystem configuration mode appropriate to the selected driving mode.

The terrain controller may be configured to operate the subsystems according to the driving mode that has been selected either manually by a user by means of a selector dial provided in a switchpack accessible to the driver whilst driving, or automatically by the terrain controller in response at least in part to signals received from various sensors on the vehicle 100. In the automatic mode of driving mode selection, the terrain controller may select the driving mode according to the type of terrain in which the vehicle 100 is operating as determined by reference at least in part to the signals received from the sensors, as described in UK patent GB2492655 referred to above.

The driving modes may include a grass/gravel/snow driving mode (GGS mode) that is suitable for when the vehicle is travelling in grass, gravel or snow terrain, a mud/ruts driving mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. The SP OFF mode may also be referred to as an 'on-road' or 'on-highway' driving mode. Many other driving modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

The manner in which the terrain controller may be configured to cause the subsystems to operate in different respective driving modes is described in more detail in UK patent GB2492655 referred to above.

Although six subsystems are described above as potentially being under the control of the terrain controller, in practice a greater number of vehicle subsystems may be included on the vehicle 100 and may be under the control of the terrain controller. The terrain controller may include a subsystem control module which provides control signals to each of the vehicle subsystems to cause each subsystem to operate in the subsystem configuration mode corresponding to the selected driving mode. Thus, each subsystem may be caused to operate in a manner appropriate to the driving condition, such as the terrain or driving surface, in which the vehicle 100 is travelling (referred to as the terrain condition). The subsystems also communicate with the terrain controller to feed back information on subsystem status.

It is to be understood that in some embodiments the driveline controller 150C may be configured to control the driveline 109 to assume the four wheel drive mode in dependence on the driving mode in which the terrain controller is causing the vehicle 100 to operate. In some embodiments, the driveline controller 150C causes the driveline 109 to operate in the four wheel drive mode when the terrain controller is operating in a driving mode other than the on-highway driving mode. When the terrain controller is operating in the on-highway driving mode the terrain controller may cause the driveline controller 150C to cause the driveline to operate in the two wheel drive or four wheel drive mode according to an active driveline control strategy.

In some embodiments, when operating in the on-highway driving mode the driveline controller 150C may be arranged to cause the driveline 109 to operate in the two wheel drive mode at speeds above a predetermined upper threshold speed for four wheel drive operation, VU. In the case that the driveline 109 is in the four wheel drive mode and the speed exceeds VU, the controller 40 causes the driveline 109 to assume the two wheel drive mode. This feature has the advantage that the vehicle will typically consume less fuel, and may also emit a lower amount of unwanted combustion products compared with continued operation in the four wheel drive mode above VU. In the present embodiment the value of VU is set to a value of 35 kph although other values may be useful in some embodiments such as 30 kph, 40 kph or any other suitable value.

In some embodiments, if the driveline 109 is in the two wheel drive mode and the vehicle speed falls below a predetermined lower threshold speed for four wheel drive operation, VL, the controller 40 causes the driveline 109 to switch from the two wheel drive mode to the four wheel drive mode. In some embodiments, VL is set to a value of 12 kph although other values may be useful in some embodiments such as 10 kph, 15 kph, 20 kph, 25 kph or any other suitable value. It is to be understood that, since VL<VU, hysteresis is present in respect of the speeds at which transitions between the two and four wheel drive modes occur. This feature has the advantage that it reduces the risk of mode chattering which might otherwise occur if VL were substantially equal to VU and the vehicle speed was to oscillate between speeds above and below VL in relatively rapid succession.

In embodiments in which the terrain controller is configured to cause the vehicle 100 to operate in one of a plurality of driving modes, the terrain controller may be configured such that automatic disconnection of the engine 110 from the driveline 109 when stopping of the vehicle 100 is detected and the brake pressure is sufficient to hold the vehicle stationary is not performed as described herein, for example with respect to FIG. 3, unless the terrain controller is causing the vehicle to operate in the on-highway mode. In some embodiments engine stop/start functionality, where present, is suspended when in a driving mode other than the on-highway mode. This is at least in part because if a vehicle 100 is operating in a mode other than the on-highway mode, the vehicle 100 may be operating in non-standard driving conditions and therefore it may be inappropriate, absent further information about the driving conditions, to permit stop/start functionality to be employed. For example, the vehicle 100 may be experiencing wading conditions in which the vehicle 100 is at least partially submerged in water. Stopping of the engine 110 when operating in such conditions may be highly inadvisable due to a risk of ingress of water to an engine exhaust gas aftertreatment system if the engine 110 is stopped.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a motor vehicle comprising:
one or more inputs to receive information indicative of a current vehicle speed, information indicative of an amount of brake force a braking system of the vehicle is developing or is capable of developing, and information indicative of a gradient of a driving surface the vehicle is on; and
wherein
the controller is configured to cause a power torque reduction operation to be performed in which one or more components in a torque transmission path from a torque delivery device to one or more driven wheels of the vehicle assume a torque reduction condition in which torque transmission from the torque delivery device to the one or more driven wheels is reduced or substantially terminated;
the controller is configured to automatically cause the torque reduction operation to be performed in dependence at least in part on the information indicative of current vehicle speed, the information indicative of the amount of brake force and the information indicative of the gradient of the driving surface;
the controller is configured to compare the current vehicle speed with a predetermined non-zero value and to not allow the torque reduction operation to take place if the current vehicle speed exceeds the predetermined non-zero value;
the controller is configured to determine, in dependence on the information indicative of the amount of brake force and the information indicative of the gradient of the driving surface, whether the amount of brake force would be sufficient to hold the vehicle stationary should the vehicle come to a halt on the driving surface; and
the controller is configured to not allow the torque reduction operation to take place if the amount of brake force would not be sufficient to hold the vehicle stationary on the driving surface.

2. The controller according to claim 1, configured to cause the torque reduction operation to take place in further dependence on information indicative of an amount of positive tractive torque at one or more wheels of the vehicle.

3. The controller according to claim 2, configured to prevent the torque reduction operation from taking place if the amount of tractive force exceeds a predetermined value.

4. The controller according to claim 1, wherein the components in the torque transmission path comprise a transmission of the vehicle and a driveline of the vehicle, and wherein the controller is configured to cause the torque reduction operation to be performed at least in part by one or more of:
causing the transmission of the vehicle to assume a condition in which the torque delivery device is at least partially disconnected from the driveline of the vehicle;
causing the transmission of the vehicle to assume a neutral-idle condition while in a forward drive mode of operation of the transmission; and
causing the transmission to transition from the forward drive mode of operation of the transmission to a neutral mode of operation of the transmission.

5. The controller according to claim 4, wherein the controller is configured to cause the torque reduction operation to be performed at least in part by also causing the driveline coupled to the transmission to assume a predetermined mode of operation.

6. The controller according to claim 1, configured to cause the torque delivery device to substantially cease torque delivery when the torque reduction operation has been completed.

7. A method of controlling a motor vehicle comprising:
receiving information indicative of a current vehicle speed;
receiving information indicative of an amount of brake force a braking system of the vehicle is developing or is capable of developing;
receiving information indicative of a gradient of a driving surface on which the vehicle is on;
causing a powertrain torque reduction operation to be performed, the torque reduction operation comprising causing one or more components in a torque transmission path from a torque delivery device to one or more driven wheels of the vehicle to assume a torque reduction condition in which torque transmission from the torque delivery device to the one or more driven wheels is reduced or substantially terminated;
automatically causing the torque reduction operation to be performed in dependence at least in part on the information indicative of the current vehicle speed, the information indicative of the amount of brake force and the information indicative of the gradient of the driving surface;
comparing the current vehicle speed with a predetermined non-zero value and not allowing the torque reduction operation to take place if the current vehicle speed exceeds the predetermined non-zero value; and
determining, in dependence on the information indicative of the amount of brake force and the information indicative of the gradient of the driving surface, whether the amount of brake force would be sufficient to hold the vehicle stationary should the vehicle come to a halt on the driving surface and not allowing the torque reduction operation to take place if the amount of brake force would not be sufficient to hold the vehicle stationary on the driving surface.

8. The method according to claim 7, comprising causing the torque reduction operation to take place in further dependence on information indicative of an amount of positive tractive torque at one or more wheels of the vehicle.

9. The method according to claim 8, comprising preventing the torque reduction operation from taking place if the amount of tractive force exceeds a predetermined value.

10. The method according to claim 7, wherein the components in the torque transmission path comprise a transmission of the vehicle and a driveline of the vehicle, and the method comprising causing the torque reduction operation to be performed at least in part by causing one or more of: the transmission of the vehicle to assume a condition in which the torque delivery device is at least partially disconnected from the driveline of the vehicle to which the transmission is coupled; causing the transmission to assume a neutral-idle condition; and causing the transmission to transition from a drive mode of operation of the transmission to a neutral mode of operation of the transmission.

11. The method according to claim 10, comprising causing the torque reduction operation to be performed at least in part by also causing the driveline coupled to the transmission to assume a predetermined mode of operation.

12. The method according to claim 11, wherein the predetermined mode of operation is a first mode and not a second mode in which the driveline is configured such that a number of the wheels driven by the torque delivery device is greater than in the first mode.

13. The method according to claim 11, wherein causing the torque reduction operation to be performed comprises causing the driveline coupled to the transmission to assume the predetermined mode of operation and subsequently causing the transmission to assume the condition in which the torque delivery device is at least partially disconnected from the driveline.

14. The method according to claim 7, comprising causing the torque delivery device to substantially cease torque delivery when the torque reduction operation has been performed.

15. A non-transitory computer readable medium including a computer program product executable by a processor so as to implement the method of claim 7.

16. A controller for a motor vehicle comprising:

one or more inputs to receive information indicative of a current vehicle speed, information indicative of an amount of brake force a braking system of the vehicle is developing or is capable of developing, and information indicative of a gradient of a driving surface the vehicle is on; and wherein the controller is configured to cause a power torque reduction operation to be performed in which one or more components in a torque transmission path from a torque delivery device to one or more driven wheels of the vehicle assume a torque reduction condition in which torque transmission from the torque delivery device to the one or more driven wheels is reduced or substantially terminated;

the controller is configured to automatically cause the torque reduction operation to be performed in dependence at least in part on the information indicative of current vehicle speed, the information indicative of the amount of brake force, information indicative of an amount of positive tractive torque at one or more wheels of the vehicle, and the information indicative of the gradient of the driving surface;

the controller is configured to determine, in dependence on the information indicative of the amount of brake force and the information indicative of the gradient of the driving surface, whether the amount of brake force would be sufficient to hold the vehicle stationary should the vehicle come to a halt on the driving surface; and the controller is configured to not allow the torque reduction operation to take place if the amount of brake force would not be sufficient to hold the vehicle stationary on the driving surface.

17. The controller according to claim 16, configured to prevent the torque reduction operation from taking place if the amount of tractive force exceeds a predetermined value.

* * * * *